UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

VIOLET DYE AND PROCESS OF MAKING SAME.

No. 877,743.     Specification of Letters Patent.     Patented Jan. 28, 1908.

Application filed February 27, 1907. Serial No. 359,642.

*To all whom it may concern:*

Be it known that we, ALBRECHT SCHMIDT, Ph.D., and ERNST BRYK, Ph.D., chemists, citizens of the Empires of Germany and Austria-Hungary, respectively, residing at Höchst-on-the-Main, Germany, have invented certain new and useful Improvements in Violet Dyes and Processes of Making the Same, of which the following is a specification.

We have found a new process of making vat dyestuffs being para-para-dimethyl-substitution products of thioindigo, for instance, para-para-dimethyl-thioindigo:

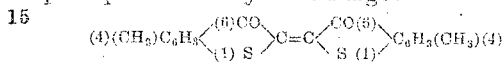

and its homologues:

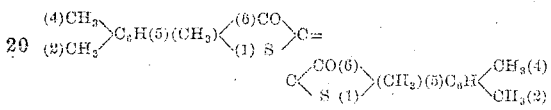

and halogen substitution products, for instance:

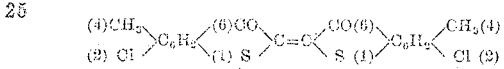

It is known that phenylglycolic acid cannot be transformed by means of sulfuric acid into thioindigo. If this acid be treated with fuming sulfuric acid then according to the patent literature thioindigo sulfonic acid is obtained, but no vat dyestuff. Now we have found that, contrary to the statement in literature relating to phenylthioglycolic acids, vat dyestuffs may be obtained from those arylthioglycolic acids as are methyl-substituted in para-position and not substituted in one ortho-position, if said acids be carefully treated in the heat or at ordinary temperature with strong sulfuric acid, for instance, monohydrate, sulfuric acid of 66° Bé. specific gravity and the like, that is to say, such dyestuffs as are not sulfonated. This careful treatment may be characterized in general by heating with sulfuric acid for so long or to such temperature, until the coloration assumed by the formed vat dyestuff in sulfuric acid occurs (mostly of a green tint) and not the coloration of the corresponding sulfonic acid dyestuff in concentrated sulfuric acid or in sodium alkaline water. Thus it appears that the arylthioglycolic acids as are methyl-substituted in para-position and not substituted in one ortho-position produce a better yield in vat dyestuffs the more the aryl-nucleus is difficult to sulfonate; in fact, the more hydrogen groups be substituted in the simplest representative of this group of arylthioglycolic acids, that is the para-tolylthioglycolic acid

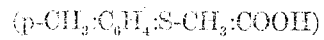

by further methyl or halogen groups. Thus, for instance, the pseudo-cumylthioglycolic acid, obtained, for instance, from the corresponding amin, the pseudo-cumidin by diazotizing, transforming into the xanthogen ester, combining the hydrolyzed xanthogen ester with chloroacetic acid, produces much better yields than the simplest representative, namely, the para-tolylthioglycolic acid itself. Moreover, from the ortho-chloro-para-methyl-thioglycolic acid

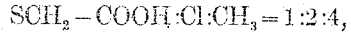

for instance, better yields are obtained than from the para-tolylthioglycolic acid or from one of the xylylthioglycolic acids (obtained from the xylidins). In all cases, however, vat dyestuffs may be obtained, though in some of a less good yield. These vat dyestuffs may be obtained by dissolving the arylthioglycolic acids methyl-substituted in para-position and not substituted in one ortho-position in several times the quantity of say concentrated sulfuric acid and by heating for a short time or stirring at gentle temperature until the formation of the vat dyestuff or the intensity of the coloration assumed by the vat dyestuff in sulfuric acid and the quantity of the alkali-insoluble product thus obtained no longer increases. The sulfuric acid, whether of 66° Bé. or monohydrate, and the temperature depend upon the nature of the substituents; in most cases condensation is effected with monohydrate. Agents accelerating the condensation and reducing the sulfonation may be added, for instance, bisulfate, pyrosulfate, boric acid, phosphoric acid, chlorids, aromatic sulfuric acids, and the like. A better yield is often obtained by adding sulfur while condensing. On completion of the condensation the product of reaction is poured on ice; it is filtered, washed with hot water, then with hot strongly diluted soda-lye to remove any unattacked parent material and alkali-soluble bodies, washed again with hot water and finally with alcohol, until the filtrate runs off completely colorless. When purified, these vat dyestuffs are insoluble in alkali carbonates and alkali hydrates and thus distinguish themselves from the sulfonic acid dyestuffs. When heated with reducing agents, for instance, with hydrosulfite in alkaline solution, they dissolve forming leuco compounds and dye from this solution cotton and wool in red-violet and blue-violet tints. The parent materials may be obtained by known methods from the corresponding amins, for instance, by diazotizing an amin methyl-substituted in para-position and not substituted in ortho-position, for instance, pseudo-cumidin, ortho-chloro-para-toluidin and the like, by combining the diazo compound with a xanthogenate and by treating the xanthogenate ester with chloroacetic acid in alkaline solution, for instance, in alcohol-alkaline solution.

Example I. 1 part by weight of pseudo-cumylthioglycolic acid $$S:CH_2.COOH:CH_3:CH_3CH_3 = 1:2:4:5,$$

obtained as described from pseudo-cumidin, is heated in the water-bath for a short time with 5 parts by weight of monohydrate or concentrated sulfuric acid, until the green coloration and formation of the dyestuff no longer increase. The product of reaction poured into water is purified in the manner above described; on reducing in alkaline solution with hydrosulfite blue-violet tints of great fastness are obtained on cotton and wool.

Example II. 1 part by weight of ortho-chloro-para-tolylthioglycolic acid obtained, for instance, in the above manner from ortho-chloro-para-toluidin, is heated in the water-bath for a short time with 5 parts by weight of monohydrate or concentrated sulfuric acid, until the coloration and formation of the dyestuff no longer increase.

The product of reaction poured into water is purified in the manner above described; on reducing in alkaline solution with hydrosulfite violet-red tints of great fastness are obtained on cotton and wool.

Having now described our invention, what we claim is:

1. The process herein described of making violet vat dyestuffs, which consists in allowing strong sulfuric acid to act on phenylthioglycolic acids methyl-substituted in para-position and not substituted in one ortho-position.

2. As a new product, the dyestuff having the formula:

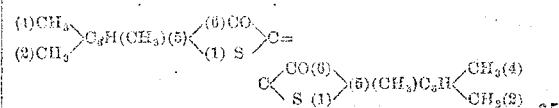

being insoluble in water, alkalies and dilute acids, soluble in hot nitrobenzene with a red-violet color, in concentrated sulfuric acid with a green color, forming a vat with alkali-hydrates from which cotton and wool are dyed in blue-violet tints.

In testimony, that we claim the foregoing as our invention, we have signed our names in presence of two subscribing witnesses.

ALBRECHT SCHMIDT.
ERNST BRYK.

Witnesses:
 JEAN GRUND,
 CARL GRUND.